US010629222B2

(12) United States Patent
Takashima et al.

(10) Patent No.: US 10,629,222 B2
(45) Date of Patent: Apr. 21, 2020

(54) SOUND SIGNAL PROCESSION METHOD AND DEVICE

(71) Applicant: Hitachi, Ltd., Tokyo (JP)

(72) Inventors: Ryoichi Takashima, Tokyo (JP); Yohei Kawaguchi, Tokyo (JP); Takashi Sumiyoshi, Tokyo (JP); Masahito Togami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 15/758,747

(22) PCT Filed: Oct. 9, 2015

(86) PCT No.: PCT/JP2015/078708
§ 371 (c)(1),
(2) Date: Mar. 9, 2018

(87) PCT Pub. No.: WO2017/061023
PCT Pub. Date: Apr. 13, 2017

(65) Prior Publication Data
US 2019/0035418 A1    Jan. 31, 2019

(51) Int. Cl.
*G10L 21/0308*    (2013.01)
*G10L 21/0272*    (2013.01)
(Continued)

(52) U.S. Cl.
CPC .......... *G10L 21/0308* (2013.01); *G10L 15/20* (2013.01); *G10L 21/028* (2013.01);
(Continued)

(58) Field of Classification Search
None
See application file for complete search history.

(56) References Cited

U.S. PATENT DOCUMENTS

| 2006/0083391 A1* | 4/2006 | Nishida .................. H04S 7/301 381/96 |
| 2013/0029684 A1 | 1/2013 | Kawaguchi et al. |
| 2014/0086423 A1* | 3/2014 | Domingo Yaguez .. H04R 3/005 381/58 |

FOREIGN PATENT DOCUMENTS

| JP | 2003-271596 A | 9/2003 |
| JP | 2006-148880 A | 6/2006 |
(Continued)

OTHER PUBLICATIONS

International Search Report of PCT/JP2015/078708 dated Dec. 28, 2015.

*Primary Examiner* — Richa Mishra
(74) *Attorney, Agent, or Firm* — Mattingly & Malur, PC

(57) ABSTRACT

A sound signal processing method and device are provided for separating sounds of the respective sound sources even when sounds are recorded asynchronously by a plurality of devices. Specifically, the present invention comprises the steps of instructing each of the plurality of devices to output a reference signal of a different frequency, receiving each of the reference signals output from the speaker of the plurality of devices according to the instruction, receiving sound signals in which each of the reference signals output from the speaker of the plurality of devices is input into the microphone of the plurality of devices, calculating a time shift amount of each of the devices based on each of the received reference signals output from the speaker and the received sound signals, and separating the plurality of signal signals input into the microphone of the plurality of devices based on the calculated time shift amount.

12 Claims, 11 Drawing Sheets

(51) Int. Cl.
    *G10L 21/028*     (2013.01)
    *G10L 15/20*     (2006.01)
    *H04R 3/00*     (2006.01)
    *H04R 3/02*     (2006.01)
    *H04M 9/08*     (2006.01)
    *G10L 21/0216*     (2013.01)

(52) U.S. Cl.
    CPC .......... *G10L 21/0272* (2013.01); *H04R 3/005* (2013.01); *G10L 2021/02166* (2013.01); *H04M 9/08* (2013.01); *H04R 3/02* (2013.01)

(56) References Cited

FOREIGN PATENT DOCUMENTS

| | | | |
|---|---|---|---|
| JP | 2010-212818 A | | 9/2010 |
| JP | 2010212818 A | * | 9/2010 |
| JP | 2013-030946 A | | 2/2013 |
| JP | 2013-186383 A | | 9/2013 |
| JP | 2014-089249 A | | 5/2014 |
| JP | 2014089249 A | * | 5/2014 |
| JP | 2014-174393 A | | 9/2014 |

* cited by examiner

SOUND SIGNAL PROCESSION METHOD AND DEVICE

TECHNICAL FIELD

The present invention relates to a sound signal processing method and a sound signal processing device for separating sounds containing a mixture of a plurality of sound sources.

BACKGROUND ART

As the background art of the present technical field, there are PTL 1 and PTL 2. PTL 1 discloses the following technology: "A complex spectrum of observation signals observed with two microphones is obtained, and an inter-microphone phase difference between the complex spectrum of observation signals is calculated for each time frequency. By using the complex spectrum of observation signals obtained from the observation signals observed with one microphone, the inter-microphone phase difference obtained with a feature quantity creation unit, and preliminary information representing the distribution of the complex spectrum of the sound source signals, parameters of a probability model representing the distribution of the complex spectrum of observation signals and the inter-microphone phase difference corresponding to the respective sound sources at each time frequency are estimated. By using a contribution ratio relative to the complex spectrum of observation signals and the inter-microphone phase difference between the respective sound sources at each time frequency obtained from the estimated parameters, the complex spectrum of separation signals is extracted from the contribution ratio and the complex spectrum of observation signals at each time frequency, and then converted into separation signals of a time domain" (refer to Abstract). Moreover, PTL 2 discloses the following technology: "A sound pressure/frequency characteristic measurement device in a voice recognition system incorporates, from a microphone, ambient noise in a period of time with no sound input, and measures a sound pressure of the ambient noise and a time change amount of the frequency characteristic. A voice recognition feasibility determination device determines whether the voice recognition is "favorable", "possible" or "impossible" based on the measured sound pressure of the ambient noise and the time change amount of the frequency characteristic. The determination result of the voice recognition feasibility determination device is notified to the user by a status notification device."

CITATION LIST

Patent Literature

PTL 1: Japanese Unexamined Patent Application Publication No. 2013-186383
PTL 2: Japanese Unexamined Patent Application Publication No. 2003-271596

SUMMARY OF THE INVENTION

Problems to be Solved by the Invention

The present invention relates to sound signal processing of separating signals containing a mixture of a plurality of sounds, and extracting the sound of each sound source. PTL 1 describes a device and a method of extracting the sound of each sound source with the sound signals recorded using a plurality of microphones as the input. Nevertheless, this method is based on the premise of the respective microphones recording sounds in synch. When the respective recording systems are not in synch, the separation performance will deteriorate because the phase difference between the observation signals will change due to differences in the timing of starting the recording and differences in the sampling frequencies, and, on the assumption that voice recognition is performed at the output stage, the voice recognition performance will also deteriorate.

While PTL 2 describes a method of determining the feasibility of voice recognition by using the sound pressure of ambient noise, PTL 2 makes no reference to a method of determining the deterioration in the voice recognition performance caused by asynchronous recording devices.

An object of this invention is to provide a sound signal processing method and a sound signal processing device for separating sounds of the respective sound sources even when sounds recorded asynchronously by a plurality of devices are used as the input.

Means to Solve the Problems

In order to achieve the foregoing object, the present invention provides a sound signal processing method in a system including a plurality of devices comprising a microphone and a speaker, comprising the steps of: instructing each of the plurality of devices to output a reference signal of a different frequency; receiving each of the reference signals output from the speaker of the plurality of devices according to the instruction; receiving sound signals in which each of the reference signals output from the speaker of the plurality of devices is input into the microphone of the plurality of devices; calculating a time shift amount of each of the devices based on each of the received reference signals output from the speaker and the received sound signals; separating the plurality of signal signals input into the microphone of the plurality of devices based on the calculated time shift amount; and outputting the separated sound signals.

Advantageous Effects of the Invention

According to the present invention, it is possible to separate sounds of the respective sound sources even in cases of inputting sounds which were recorded asynchronously by a plurality of devices.

DESCRIPTION OF EMBODIMENTS

Embodiments of the present invention are now explained in detail with reference to the appended drawings.

Embodiment 1

In this embodiment, explained is an example of a signal processing device 100 which performs sound source separation to sounds recorded asynchronously with a plurality of devices.

Figure 1:
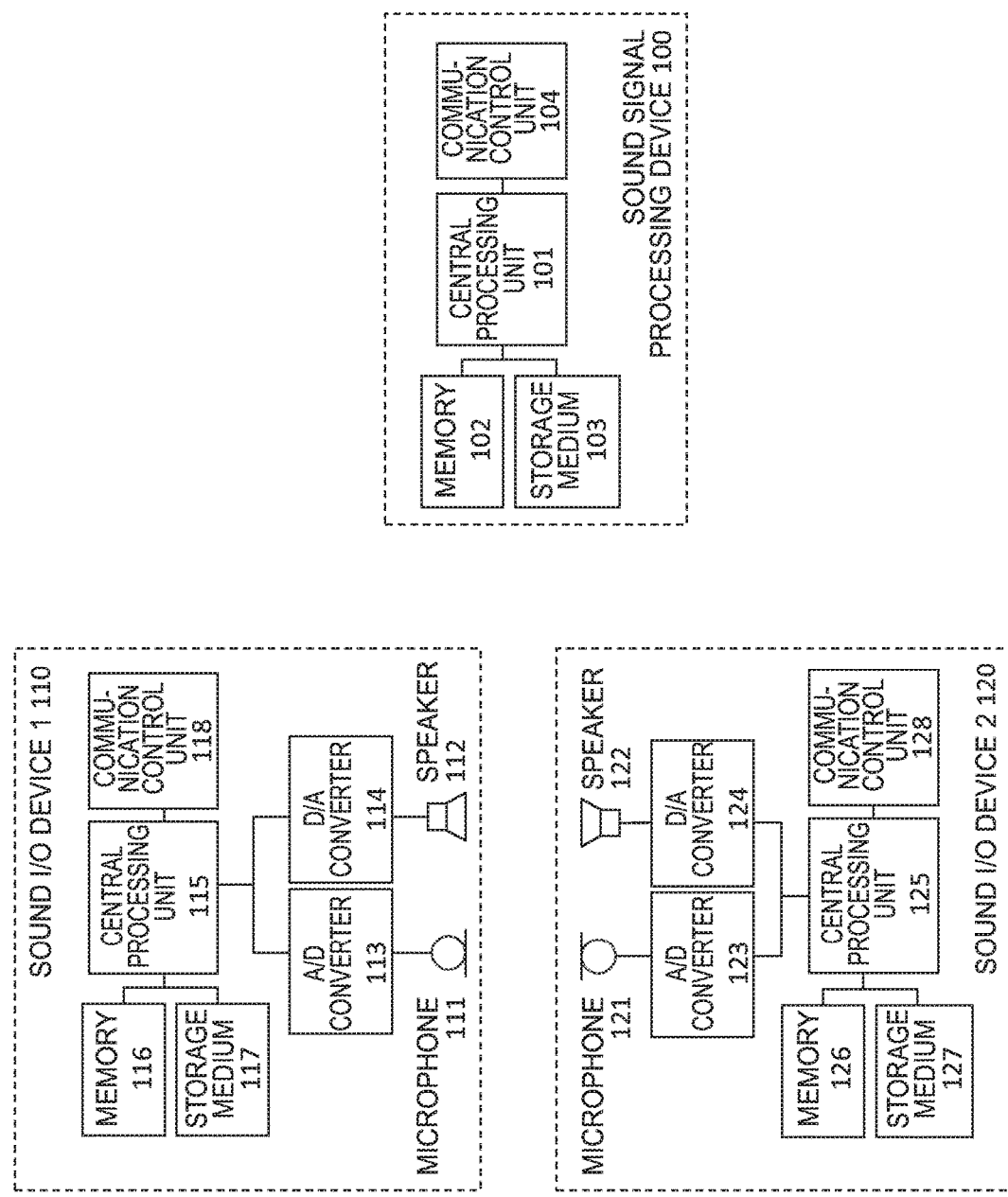
FIG. 1 is a configuration diagram of the sound signal processing device and the sound I/O device according to an embodiment of the present invention.

FIG. 1 shows a configuration diagram of the sound source separation system according to this embodiment. The sound separation system in this embodiment is configured by two sound I/O devices 110, 120 and the signal processing device 100 which performs sound source separation engaging in wireless communication.

Each of the sound I/O devices (110 and 120) is configured from a microphone (111 and 121), a speaker (112 and 122), an A/D converter (113 and 123), a D/A converter (114 and 124), a central processing unit (115 and 125), a memory (116 and 126), a storage medium (117 and 127), and a communication control unit (118 and 128). As devices having the foregoing configuration, for instance, considered may be portable terminals such as smartphones and tablet PCs.

The signal processing device 100 is configured from a central processing unit 101, a memory 102, a storage medium 103, and a communication control unit 104.

In each of the devices (110 and 120), digital signals are converted into analog signals by the D/A converter (112 and 122), and sound is thereafter output from the speaker (112 and 122). Simultaneously, the microphone (111 and 121) records ambient sounds, and the recorded analog signals are converted into digital signals by the A/D converter (113 and 123). The foregoing sound I/O are performed asynchronously.

The central processing unit (115 and 125) stores, in the memory (116 and 126), the digital signals output from the speaker and the digital signals input into the microphone. The communication control unit (118 and 128) sends, to the communication control unit 104 of the signal processing device 100, the speaker output signals and the microphone input signals stored in the memory.

The central processing unit 101 of the signal processing device 100 stores the signals received from the device (110 or 120) in the memory 102, and thereafter performs sound source separation processing. Moreover, as the processing required for sound source separation, the central processing unit 101 has the function of sending reference signals to the communication control unit (118 and 128) of each of the devices through the communication control unit 104.

The foregoing series of processing are executed by the programs stored in the respective storage mediums 103, 117 and 127.

Figure 2:
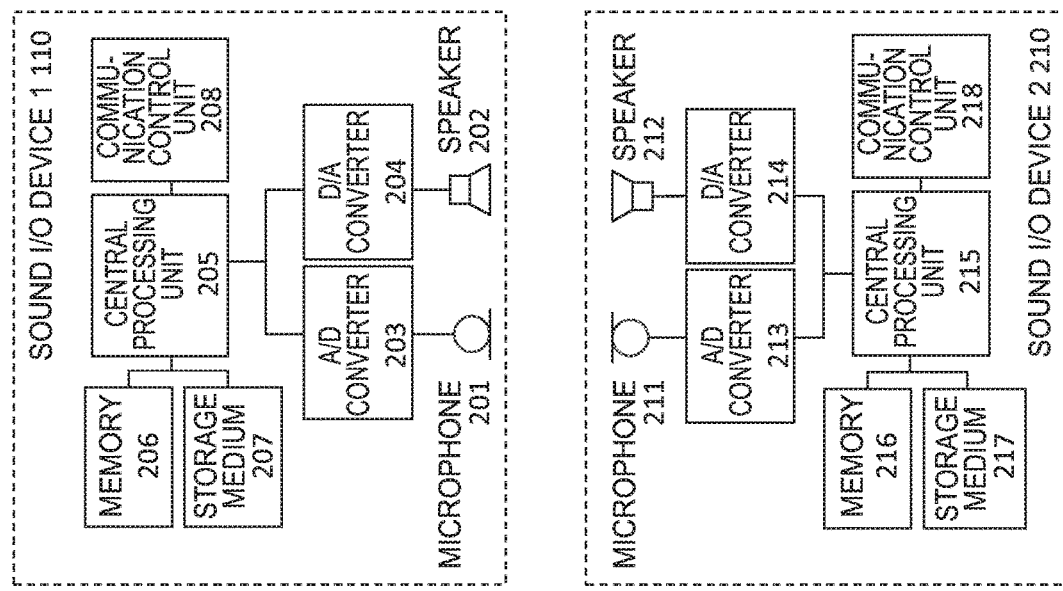
FIG. 2 is a configuration diagram for causing the sound I/O device to execute the sound signal processing.
Figure 3:
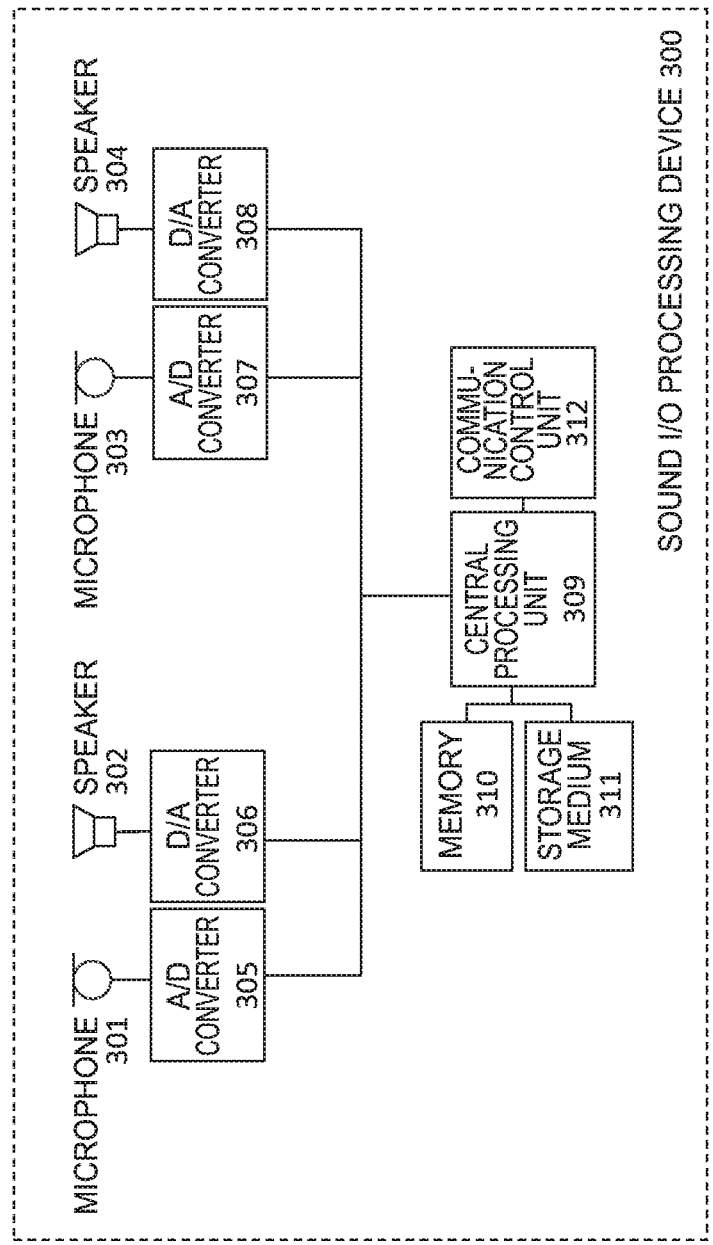
FIG. 3 is a configuration diagram of the sound signal processing device including the sound I/O function.

In the configuration of FIG. 1, while the respective devices 110, 120 and the signal processing device 100 engage in wireless communication, the configuration may also be such that the sound source separation processing is executed by one device, or both devices, as shown in FIG. 2. In the foregoing case, the central processing unit (205 and/or 215) of one device or both devices has the function of performing the sound source separation processing. Moreover, it is also possible to adopt a configuration where the signal processing device 300 has the sound I/O function without using independent devices (that is, configuration where the devices 110, 120 and the signal processing device 100 in FIG. 1 are formed integrally) as shown in FIG. 3. This embodiment will explain an example in which the configuration in FIG. 1 is adopted.

Figure 4:
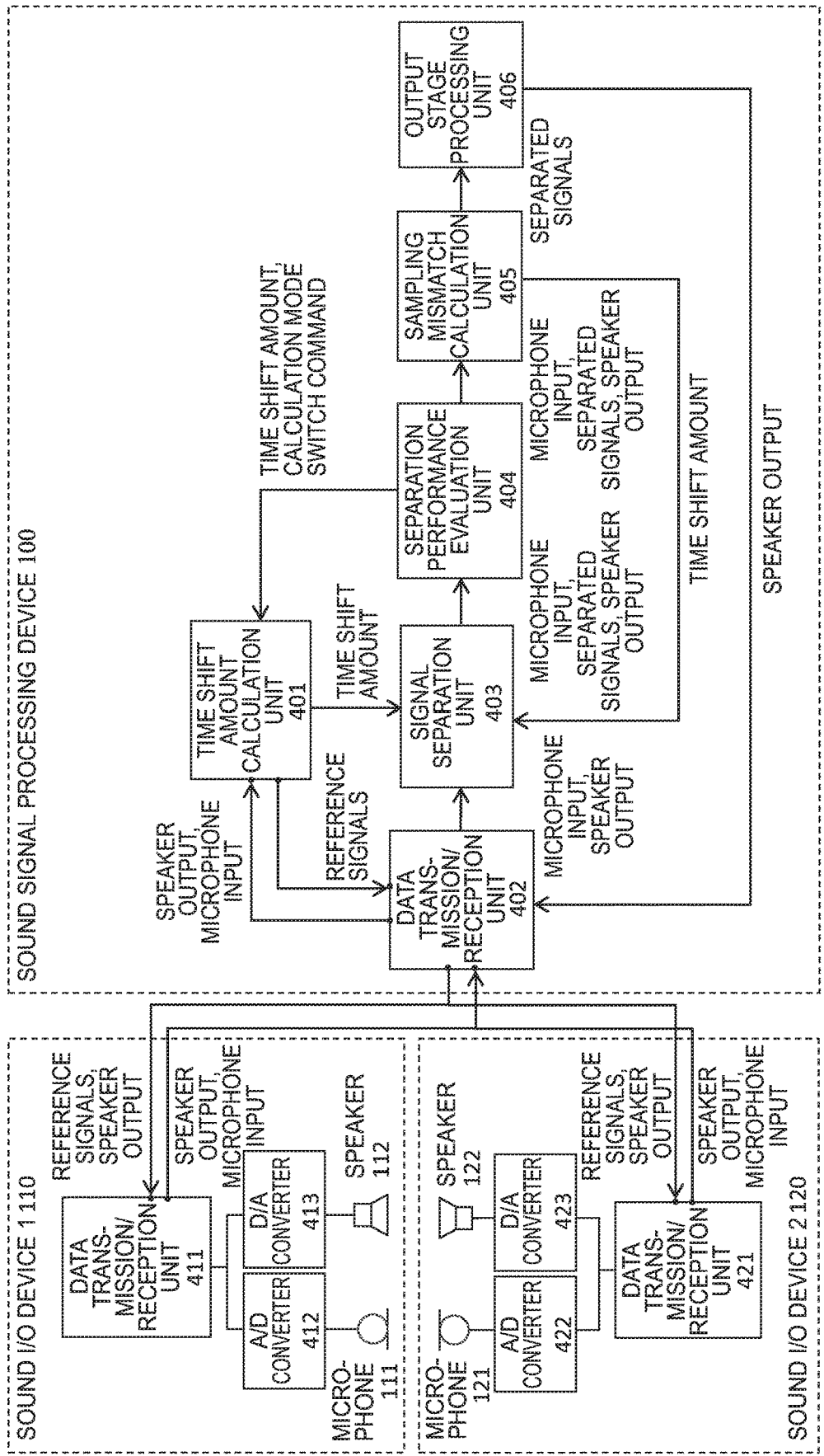
FIG. 4 is a functional block diagram of the signal processing device 100 and the sound I/O devices 110 and 120 according to this embodiment.

FIG. 4 is a functional block diagram of the signal processing device 100 and the sound I/O devices 110 and 120 according to this embodiment.

In each of the devices (110, 120), the data transmission/reception unit (411 and 421) receives the reference signals and the speaker output signals from the data transmission/reception unit 402 of the signal processing device 100, and these signals are output from the speaker (112 and 122) through the D/A converter (413 and 423). Simultaneously, the ambient sounds recorded by the microphone (111 and 121) are converted into digital signals with the A/D converter (412 and 422), and thereafter sent by the data transmission/reception unit (411 and 421) to the data transmission/reception unit 402 of the signal processing device 100.

The time shift amount calculation unit 401 in the signal processing device 100 causes the reference signals to be output from the speaker (112, 122) through the data transmission/reception unit (402, 411, 421) and the D/A converter (412, 423) of each of the devices in order to calculate the time shift amount between the microphone input signals of each of the devices and the time shift amount between the microphone input and the speaker output of each of the devices. Here, the time shift amount calculation unit 401 receives the microphone input signals and the speaker output signals of each of the devices through the data transmission/reception unit (402, 411, 421), and thereby calculates the time shift amount.

The signal separation unit 403 performs signal separation and echo cancellation with the microphone input signals and the speaker output signals input from the data transmission/reception unit 402 and the time shift amount calculated by the time shift amount calculation unit 401 as the inputs. Here, the term "echo" refers to the sound that is output from the speaker, and then wrapped around and recorded by the microphone. The signal separation unit 403 outputs the separated signals, the microphone input, and the speaker output to the separation performance evaluation unit 404.

The separation performance evaluation unit 404 evaluates the separation performance with the separated signals sent from the signal separation unit 403 as the input. Here, when the separation performance is equal to or less than a threshold, by sending a time shift amount calculation mode switch instruction to the time shift amount calculation unit 401, the time shift amount calculation unit 401 once again performs the time shift amount calculation processing.

The sampling mismatch calculation unit 405 sequentially calculates the time shift amount caused by errors in the sampling frequencies with the microphone input, the separated signals, and the speaker output sent from the separation performance evaluation unit 404 as the inputs, and feeds back the results to the signal separation unit 403.

The sampling mismatch calculation unit 405 outputs the separated signals to the output stage processing unit 406, the output stage processing unit 406 performs some kind of processing by using the received separated signals, and causes some kind of sound as the processing result to be output from the speaker of each of the devices through the data transmission/reception unit 402. As the processing performed by the output stage processing unit 406, for instance, considered may be sound translation processing of performing voice recognition using the separated signals, translating the recognition results into a different language, and outputting the translated sound from the speaker.

Figure 5:
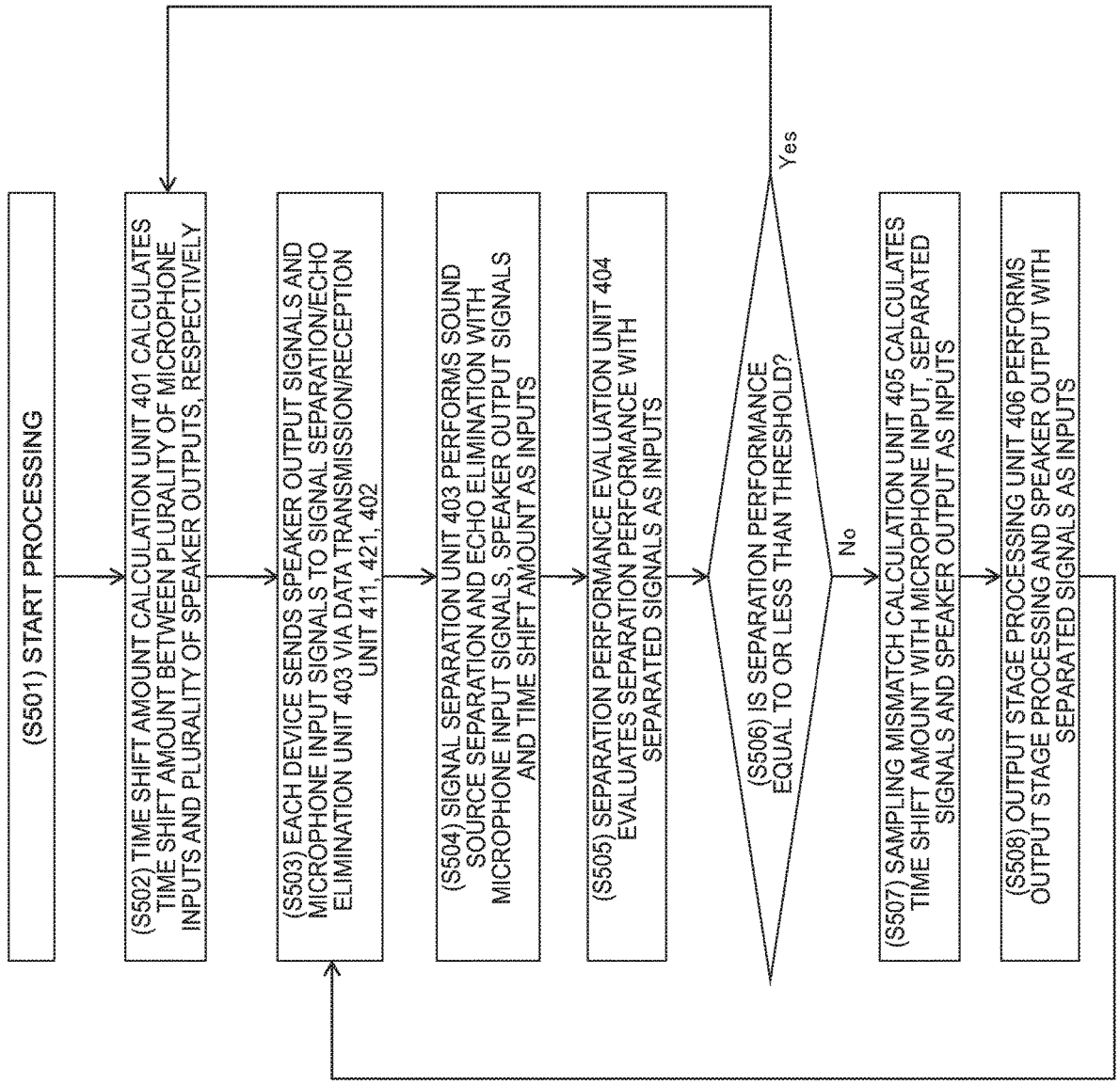
FIG. 5 is a processing flowchart of the signal processing device 100 according to this embodiment.

FIG. 5 is a processing flowchart of the signal processing device 100 according to this embodiment. After the processing is started (S501), foremost, the time shift amount calculation unit 401 calculates the time shift amount between the microphone input signals of each of the devices and the time shift amount between the microphone input and the speaker output of each of the devices (S502). Subsequently, each of the devices continue to constantly perform sound I/O, and sends the microphone input and the speaker output to the signal processing device 100 for each sound I/O that is performed (S503). Next, the signal separation unit 403 performs sound source separation and echo cancellation to the microphone input signals (S504). Next, the separation performance evaluation unit 404 evaluates the separation performance of the separated signals (S505).

In the evaluation processing of S505, when the separation performance is equal to or lower than a threshold (S506: Yes), it is determined that the I/O of the devices is not synchronized, and the time shift amount calculation processing (S502) is performed once again. When the separation performance exceeds a threshold (S506: No), the sampling mismatch calculation unit 405 sequentially calculates the time shift amount caused by errors in the sampling frequencies of each of the devices (S507). Subsequently, output stage processing such as voice recognition is performed, and the result is output to the speaker as needed (S508). Sound source separation, separation performance evaluation, sampling mismatch calculation, and output stage processing (S503 to S508) are repeatedly performed based on the microphone input and the speaker output. Each type of processing is now explained in detail.

Figure 6:
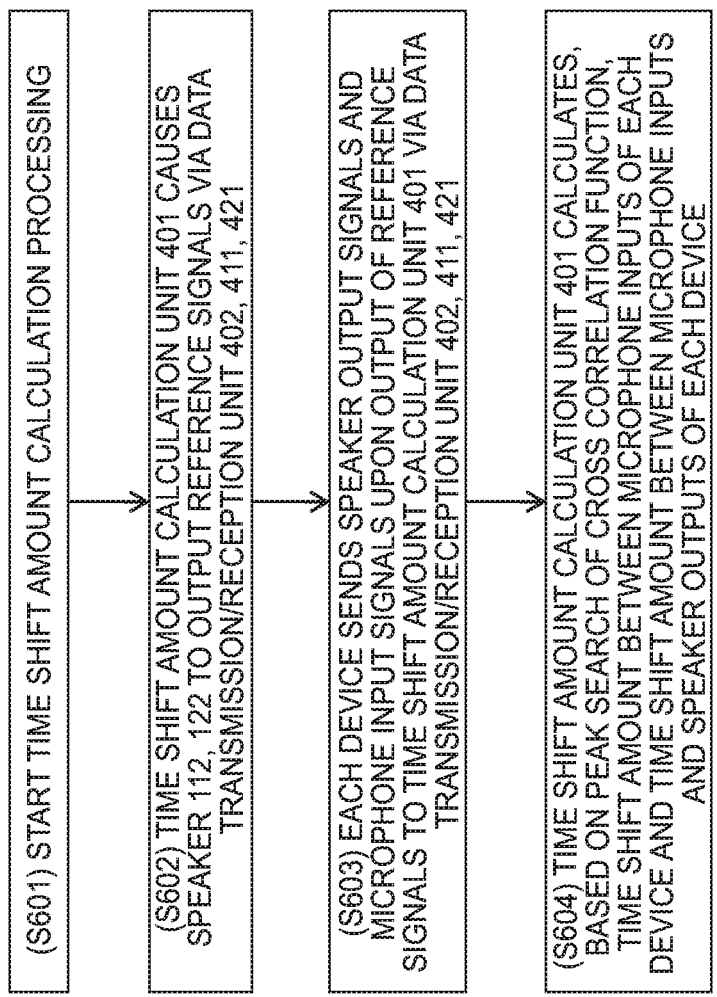
FIG. 6 is a processing flow explaining the time shift amount calculation processing (S502) in detail.

FIG. 6 is a processing flow explaining the time shift amount calculation processing (S502) in FIG. 5 in detail. Foremost, the time shift amount calculation unit 401 causes the reference signals to be output from the speaker 112, 122 through the data transmission/reception unit 402, 411, 421 (S602). Next, each of the devices sends the speaker output signals and the microphone input signals, in a period of time that the reference signals were output, to the time shift amount calculation unit 401 through the data transmission/reception unit 411, 421, 402 (S603). Subsequently, the time shift amount calculation unit 401 calculates the time shift amount between the microphone inputs of each of the devices and the time shift amount between the microphone input and the speaker output of each of the devices (S604).

Figure 7:
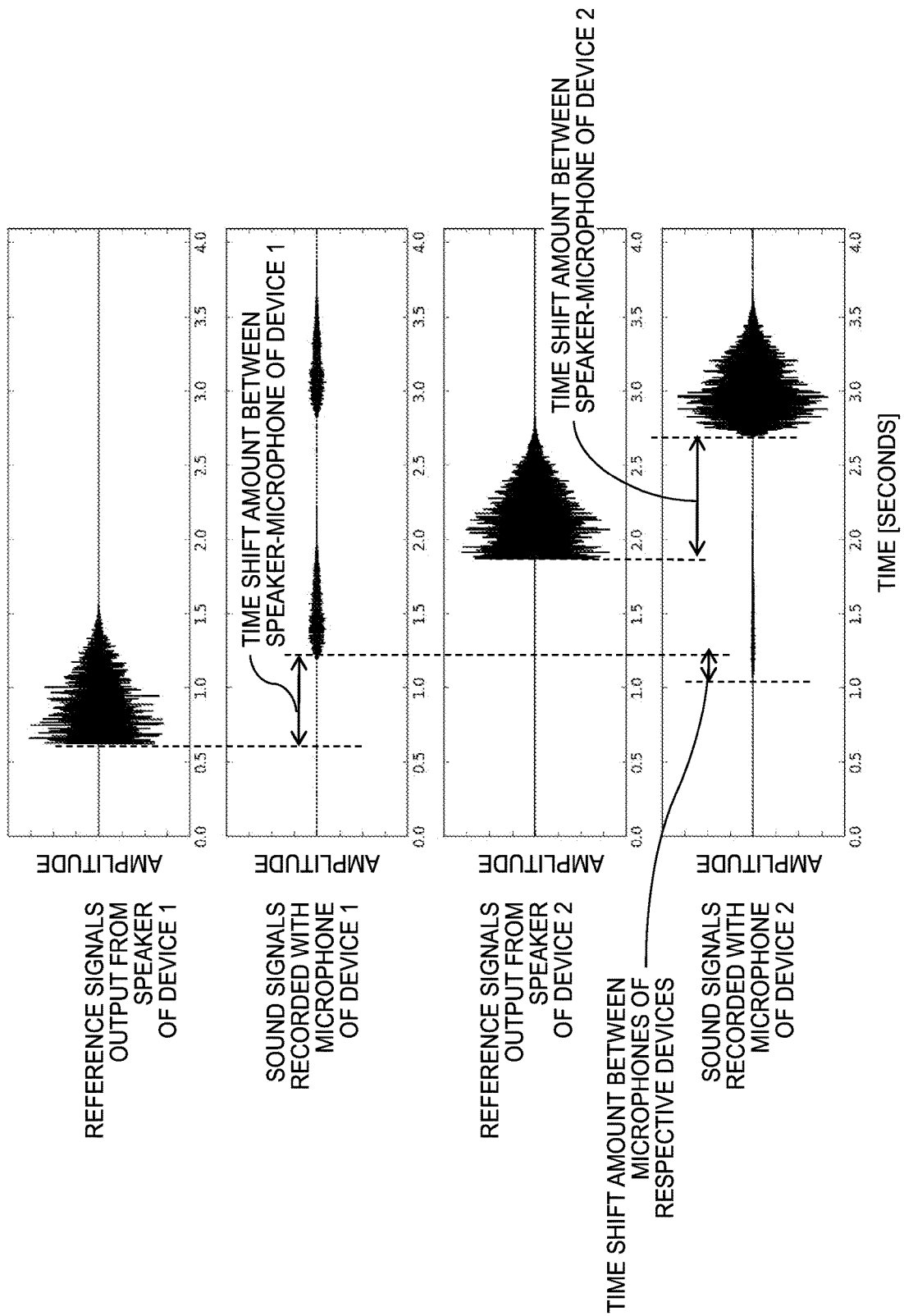
FIG. 7 is an example of the reference signals output from the respective devices, and the microphone input signals of the respective devices during the output of reference signals.

FIG. 7 is an example of the reference signals output from the respective devices, and the microphone input signals of the respective devices during the output of reference signals. Foremost, on the assumption that the A/D conversion and the D/A conversion were performed in synch in each of the devices, reference signals are observed at the same timing in the speaker output signals and the microphone input signals. Nevertheless, when the A/D conversion and the D/A conversion are not in synch, a time shift caused by the processing delay in the devices will exist between the speaker output and the microphone input of each of the devices. Moreover, the microphone input signals of each of the devices will include a time shift resulting from the difference in the timing of starting the recording (refer to FIG. 7).

In the time shift amount calculation processing (S502 of FIG. 5), the foregoing time shift amount is calculated. As such calculation method, the time shift amount between signals can be calculated by calculating the cross correlation function of each of the corresponding reference signals, and using the time that the cross correlation coefficient reaches its peak. Nevertheless, here, there may be cases where the cross correlation function of non-corresponding reference signals is calculated, and an erroneous time shift amount is consequently calculated.

In FIG. 7, reference signals are output in order from device 1 and then device 2, and the respective reference signals are recorded with the microphone of each of the devices. Here, of the two reference signals recorded with the microphone, the signal that was recorded first should correspond to the reference signal of device 1, and the signal that was recorded subsequently should correspond to the reference signal of device 2. Nevertheless, in cases where the output interval of the reference signals of each of the devices is short and the reference signals become overlapped, there may be cases where the cross correlation function of non-corresponding reference signals is calculated, and consequently the time shift amount cannot be calculated correctly. As the measure to deal with the foregoing problem, in this embodiment, reference signals having a frequency band that is unique to each of the devices are output. By calculating the cross correlation function by narrowing down the reference signals to the frequency band set for each of the devices, the cross correlation function of non-corresponding reference signals will be a low value, and the time shift amount can therefore be calculated stably.

Moreover, in this embodiment, reference signals of an audible range are output. Meanwhile, by outputting sounds of an inaudible range, such as ultrasonic sounds, as the reference signals at predetermined intervals (or constantly), it is also possible to calculate the time shift amount as required in parallel with the sound separation processing.

The signal processing device 100 uses the time shift amount calculated by the time shift amount calculation unit 401 and matches the time between asynchronous microphone input signals and speaker output signals.

Figure 8:
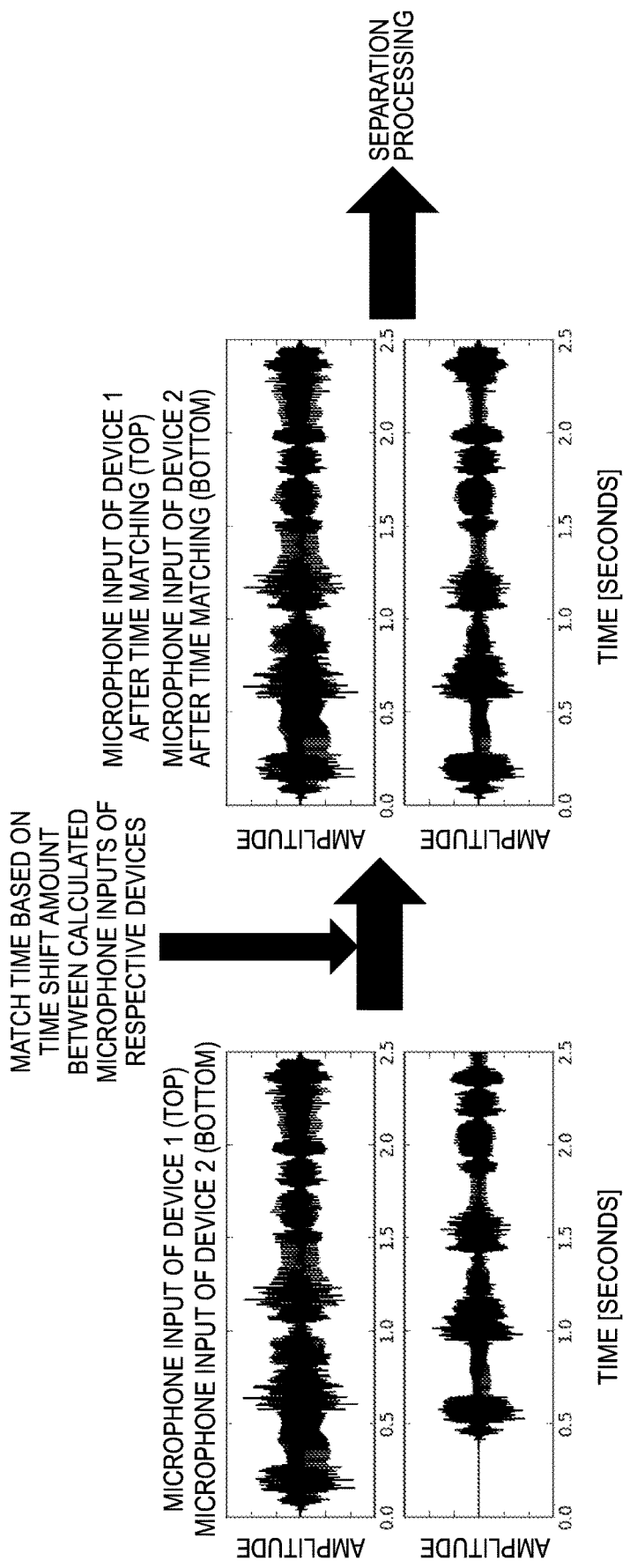
FIG. 8 is an example of matching the time of the microphone input signals in the respective devices by using the calculated time shift amount.

FIG. 8 is an example of matching the time of the microphone input signals in the respective devices by using the calculated time shift amount. When the time of each signal is mismatched, it is difficult to apply conventional sound source separation methods and echo cancelling methods that use a plurality of microphones. This is because, as described above, conventional sound source separation methods and echo cancelling methods are based on the premise that the plurality of microphones are synchronized, or that the microphone and the speaker are synchronized.

Thus, in this embodiment, sound source separation and echo cancelling are enabled by matching the time of each signal by using the time shift amount calculated by the time shift amount calculation unit 401. Incidentally, sound source separation and echo cancelling may respectively be performed by using known microphone array methods or echo cancelling methods.

Figure 9:
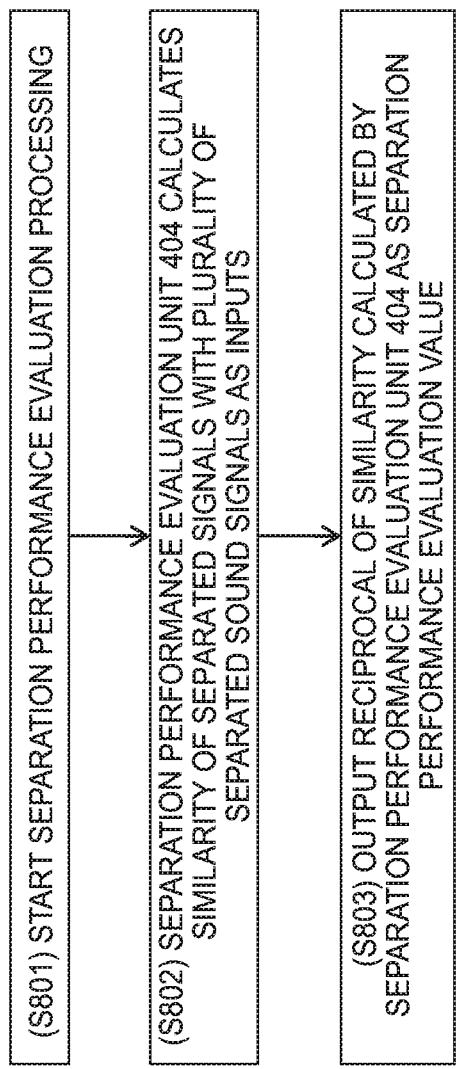
FIG. 9 is a processing flow explaining the separation performance evaluation processing (S505) in detail.

FIG. 9 is a processing flow explaining the separation performance evaluation processing (S505 of FIG. 5) in detail. In this processing, the separation performance evaluation unit 404 evaluates the separation performance of the plurality of sound signals, which were separated by the signal separation unit 403, by calculating the degree of similarity or correlation coefficient of the separated signals. For example, the separation performance evaluation unit 404 calculates the degree of similarity of the separated signals (S802), and uses the reciprocal of the calculated degree of similarity as the performance evaluation value (S803).

Figure 10:
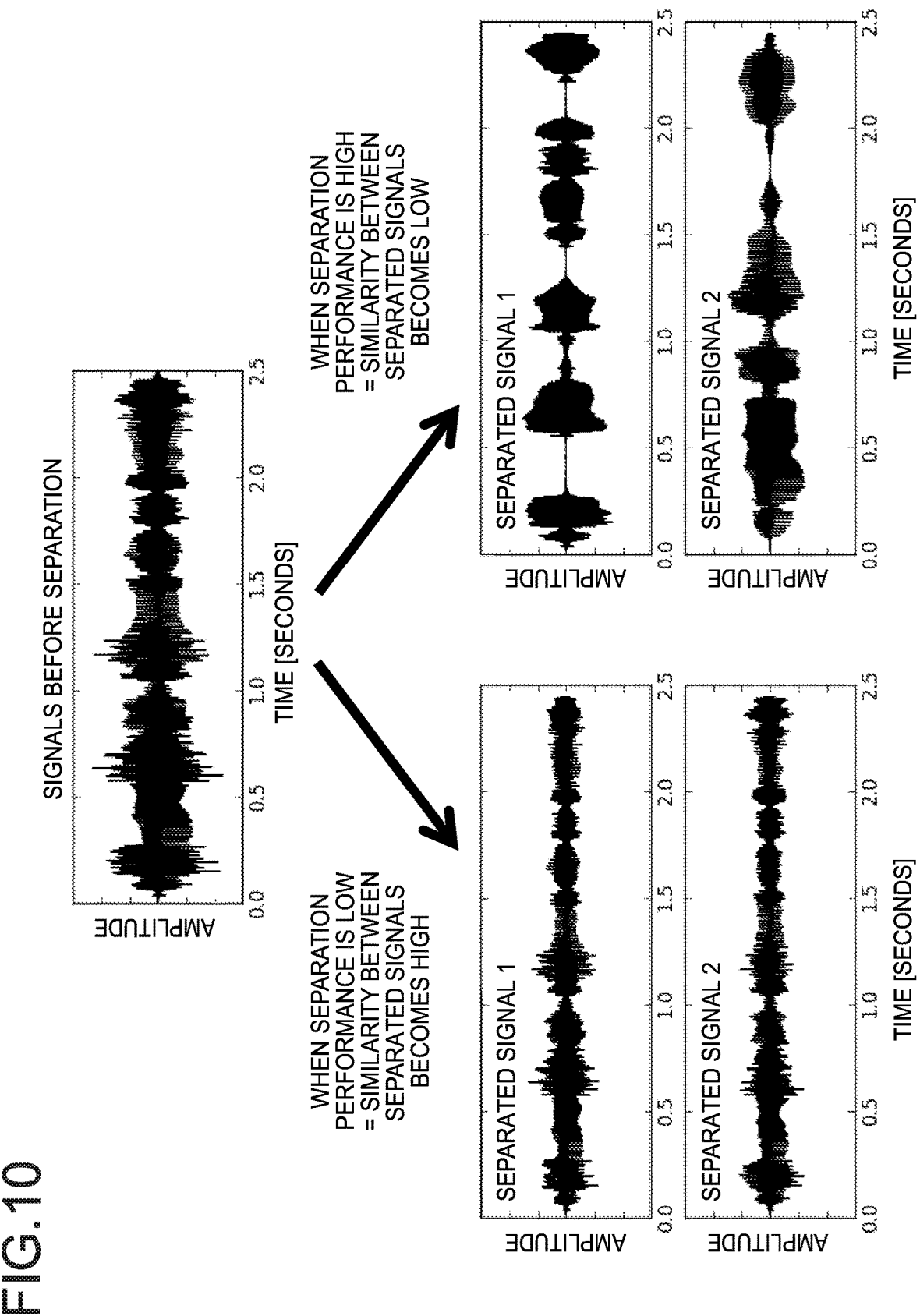
FIG. 10 is an example showing a case where a signal with two sounds mixed therein is separated into two signals based on low separation performance, and separated into two signals based on high separation performance.

FIG. 10 is an example showing a case where a signal with two sounds mixed therein is separated into two signals based on low separation performance, and separated into two signals based on high separation performance. Because the mixed sounds are basically the utterance of independent contents, when separation has been performed with high accuracy, the separated signals will be independent sounds that are mutually dissimilar. Meanwhile, when the level of separation performance is low, because the respective sounds will remain as noise in the separated signals, the separated signals will become mutually similar sounds. By leveraging this quality, the separation performance is evaluated by using the degree of similarity or the correlation coefficient of the separated signals.

As the degree of similarity, for instance, considered may be measuring the euclid distance of the mutual signals and using the reciprocal thereof. By using the obtained degree of similarity or correlation coefficient and setting the reciprocal thereof as the index which represents the separation performance, it is possible to determine that the separation was not performed properly when the foregoing index is equal to or less than a predetermined threshold. Otherwise, the degree of similarity or the correlation coefficient may be used as is, and it is possible to determine that the separation was not performed properly when the value thereof is equal to or greater than a predetermined threshold.

In this embodiment, in the evaluation processing performed by the separation performance evaluation unit 404, it is determined that the time shift amount was not calculated properly when it is determined that the separation was not performed properly, and the time shift calculation processing (S502) is performed once again. Consequently, even in cases where the time matching between the signals midway during the separation processing cannot be performed accurately, it is possible to automatically detect the same and perform the time shift calculation processing once again.

Figure 11:
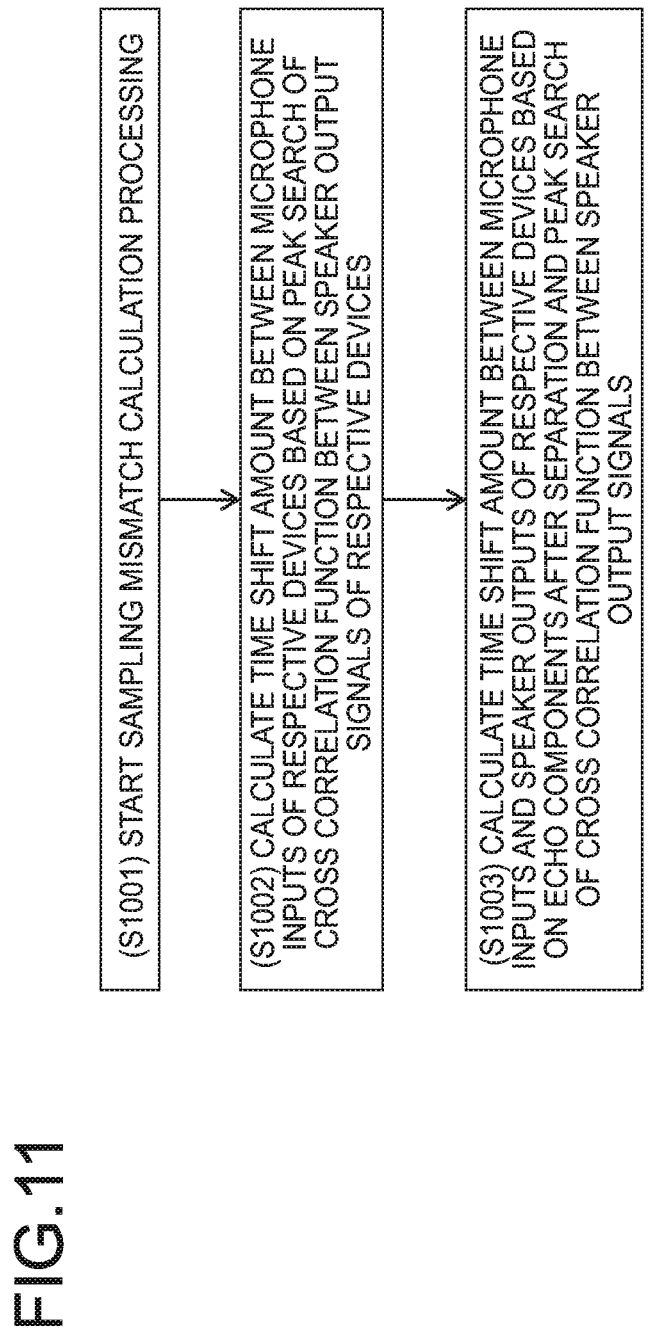
FIG. 11 is a processing flow explaining the sampling mismatch calculation processing (S507) in detail.

FIG. 11 is a processing flow explaining the sampling mismatch calculation processing (S507 of FIG. 5) in detail. The sampling mismatch calculation unit 405 calculates the time shift amount between the microphone input signal of each of the devices by calculating the cross correlation function between the microphone input signals of each of the devices (S1002). Furthermore, the sampling mismatch calculation unit 405 calculates the time shift amount between the microphone input and the speaker output of each of the devices by calculating the cross correlation function between the separated echo components and the speaker output signals (S1003).

Even when the time shift amount is initially calculated in the processing of S502, the time shift amount will change as the separation processing or the output stage processing is continuously performed. This is because there are errors in the sampling frequencies depending on each of the devices. Thus, while it is necessary to sequentially recalculate the time shift amount, outputting reference signals each time will obstruct the output stage processing. Thus, in the sampling mismatch calculation processing S507, the time shift amount is sequentially calculated by using the microphone input and the speaker output in substitute for the reference signals. Foremost, the calculation of the time shift amount between the microphone input signals of each of the devices (S1002) can be performed by calculating the cross correlation function between the microphone input signals before the sound source separation, and searching for the peak thereof. Next, the time shift amount between the microphone input and the speaker output of each of the devices is calculated (S1003). Here, because the microphone input signals contain external sounds in addition to echo components from the speaker output, the cross correlation function between the echo components obtained from the sound source separation processing and the speaker output is calculated and the peak thereof is searched in order to calculate the time shift amount between the microphone input and the speaker output of each of the devices.

Note that, as described above, when sounds in an inaudible range are used as the reference signals, the time shift amount can be sequentially calculated by outputting the reference signals at predetermined intervals (or constantly).

REFERENCE SIGNS LIST

100 sound signal processing device
101 central processing unit of sound signal processing device 100
102 memory of sound signal processing device 100
103 storage medium of sound signal processing device 100
104 communication control unit of sound signal processing device 100
110 sound I/O device 1
111 microphone of sound I/O device 1 (110)
112 speaker of sound I/O device 1 (110)
120 sound I/O device 2
121 microphone of sound I/O device 2 (120)
122 speaker of sound I/O device 2 (120)
401 time shift amount calculation unit
402 data transmission/reception unit
403 signal separation unit
404 separation performance evaluation unit
405 sampling mismatch calculation unit
406 output stage processing unit
411 data transmission/reception unit in sound I/O device 1 (110)
412 A/D converter in sound I/O device 1 (110)
413 D/A converter in sound I/O device 1 (110)
421 data transmission/reception unit in sound I/O device 2 (120)
422 A/D converter in sound I/O device 2 (120)
423 D/A converter in sound I/O device 2 (120)

The invention claimed is:

1. A sound signal processing method in a system including a plurality of devices comprising a microphone and a speaker, comprising:
   instructing each of the plurality of devices to output a reference signal of a different frequency;
   receiving each of the reference signals output from the speaker of the plurality of devices according to the instruction;
   receiving a plurality of sound signals in which each of the reference signals output from the speaker of the plurality of devices is input into the microphones of the plurality of devices;
   calculating a time shift amount of each of the devices based on each of the received reference signals output from the speaker and the received sound signals input into the microphones of the plurality of devices;

separating the plurality of sound signals input into the microphones of the plurality of devices, based on the calculated time shift amount, into a plurality of separated sound signals;

outputting the separated sound signals;

evaluating a separation performance of the sound signals from the separated sound signals;

when the evaluated separation performance exceeds a threshold, calculating a time shift amount of the sound signals based on the separated sound signals and the sound signals output from the speaker of the plurality of devices; and separating the respective sound signals based on the calculated time shift amount;

wherein the separation performance of the sound signals is evaluated by using a degree of similarity or a correlation coefficient between the separated sound signals.

2. The sound signal processing method according to claim 1, further comprising when the evaluated separation performance is equal to or less than a threshold, once again instructing each of the plurality of devices to output a reference signal of a different frequency.

3. The sound signal processing method according to claim 1, wherein the reference signal is a signal of an inaudible range.

4. The sound signal processing method according to claim 3, wherein the reference signal is output from the speaker of the plurality of devices at predetermined intervals, and wherein the time shift amount of each of the devices is calculated when the reference signal is output from the speaker.

5. A sound signal processing device connected to a plurality of devices including a microphone and a speaker, the device comprising a computer programmed to:

send reference signals each having a different frequency to the plurality of devices, and receive each of the reference signals output from the speaker of the plurality of devices and a plurality of sound signals in which the reference signal was input into the microphones of the plurality of devices;

calculate a time shift amount of each of the devices based on the output reference signals and the plurality of sound signals input into the microphones of the plurality of devices;

separate the plurality of sound signals input into the microphones of the plurality of devices, based on the calculated time shift amount, into a plurality of separated sound signals;

send the plurality of separated sound signals to the plurality of devices;

evaluate a separation performance of the sound signals from the separated sound signals; and when the evaluated separation performance exceeds a threshold, calculate a time shift amount of the sound signals based on the separated sound signals and the sound signals output from the speaker of the plurality of devices, and separate the respective sound signals based on the calculated time shift amount;

wherein the separation performance of the sound signals is evaluated by using a degree of similarity or a correlation coefficient between the separated sound signals.

6. The sound signal processing device according to claim 5, wherein the reference signal is a signal of an inaudible range.

7. The sound signal processing device according to claim 6, wherein the computer is programmed to calculate the time shift amount of each of the devices at predetermined intervals based on the output reference signals and the input sound signals.

8. A sound signal processing method in a system comprising a plurality of devices including a microphone and a speaker, wherein the microphone and the speaker included in the device are asynchronous, wherein the plurality of microphones are asynchronous, the method comprising:

instructing each of the plurality of devices to output a reference signal of a different frequency;

receiving each of the reference signals output from the speaker of the plurality of devices according to the instruction;

receiving a plurality of sound signals in which each of the reference signals output from the speaker of the plurality of devices is input into the microphones of the plurality of devices;

calculating, for each of the devices, a time shift amount based on a reference signal output from the speaker and a sound signal input into the microphone, so as to obtain calculated time shift amounts for the plurality of devices having sound signals input into the microphones;

separating the sound signals input into the microphones of the plurality of devices, based on the calculated time shift amounts, into a plurality of separated sound signals;

outputting the separated sound signals;

evaluating a separation performance of the sound signals from the separated sound signals; and when the evaluated separation performance exceeds a threshold, calculating a time shift amount of the sound signals based on the separated sound signals and the sound signals output from the speaker of the plurality of devices, and separating the respective sound signals based on the calculated time shift amount;

wherein the separation performance of the sound signals is evaluated by using a degree of similarity or a correlation coefficient between the separated sound signals.

9. The sound signal processing method according to claim 8, further comprising:

when the evaluated separation performance is equal to or less than a threshold, instructing each of the plurality of devices to output a reference signal of a different frequency.

10. The sound signal processing method according to claim 8, wherein the reference signal is a signal of an inaudible range.

11. The sound signal processing method according to claim 10, wherein the reference signal is output from the speaker of the plurality of devices at predetermined intervals, and wherein the time shift amount of each of the devices is calculated when the reference signal is output from the speaker.

12. The sound signal processing device according to claim 5, wherein the computer is programmed to:

when the evaluated separation performance is equal to or less than a threshold, once again send reference signals each having a different frequency to the plurality of devices.

* * * * *